June 10, 1941.　　　D. A. SANDIN　　　2,244,854
DOUGHNUT MAKING MACHINE
Filed Sept. 5, 1939　　　5 Sheets-Sheet 1

Inventor
David A. Sandin
By his Attorneys

June 10, 1941.   D. A. SANDIN   2,244,854
DOUGHNUT MAKING MACHINE
Filed Sept. 5, 1939   5 Sheets-Sheet 2

Inventor
David A. Sandin
By his Attorneys

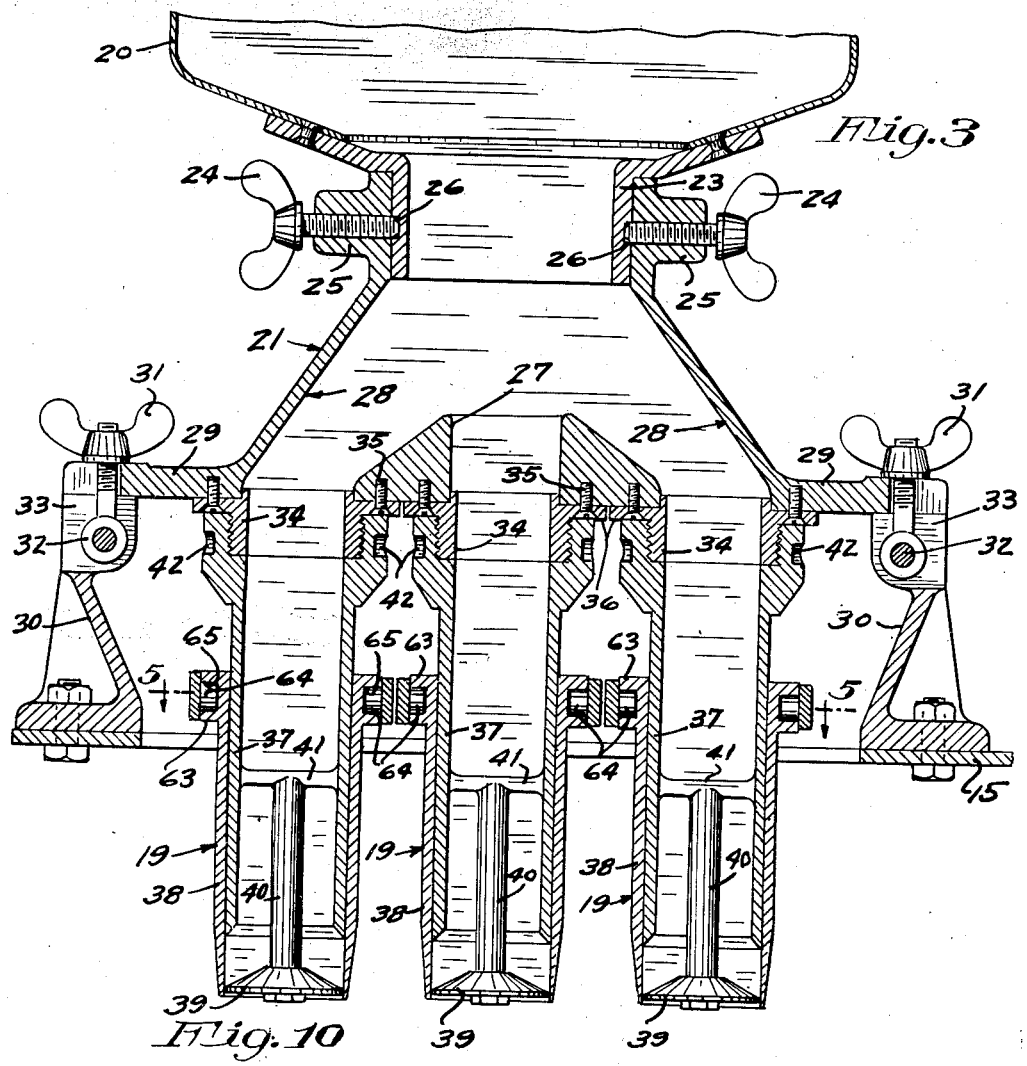
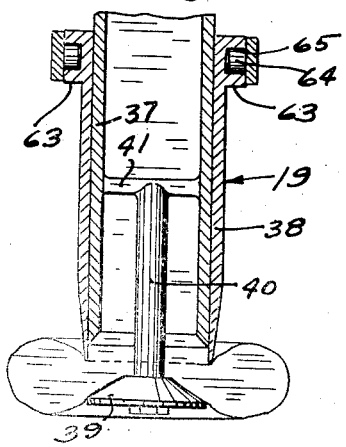

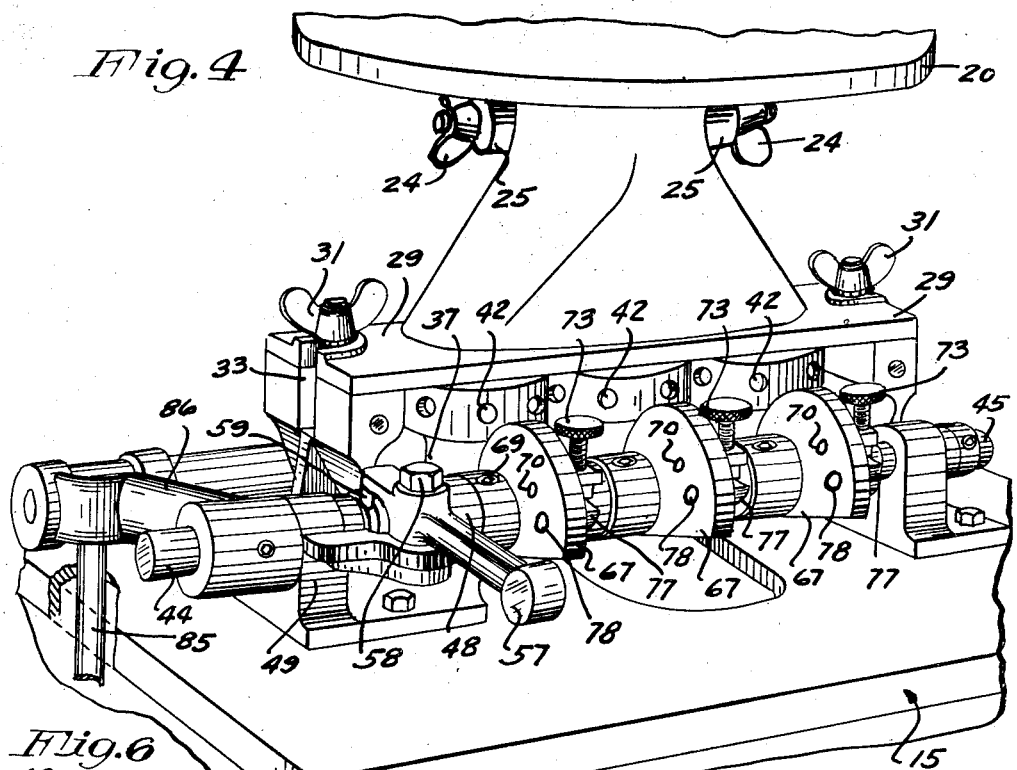

June 10, 1941.　　　D. A. SANDIN　　　2,244,854
DOUGHNUT MAKING MACHINE
Filed Sept. 5, 1939　　　5 Sheets-Sheet 5
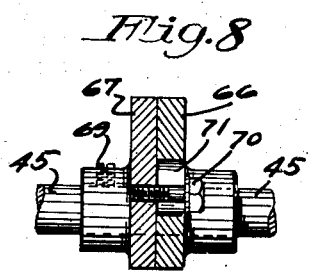
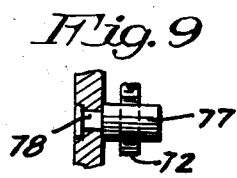
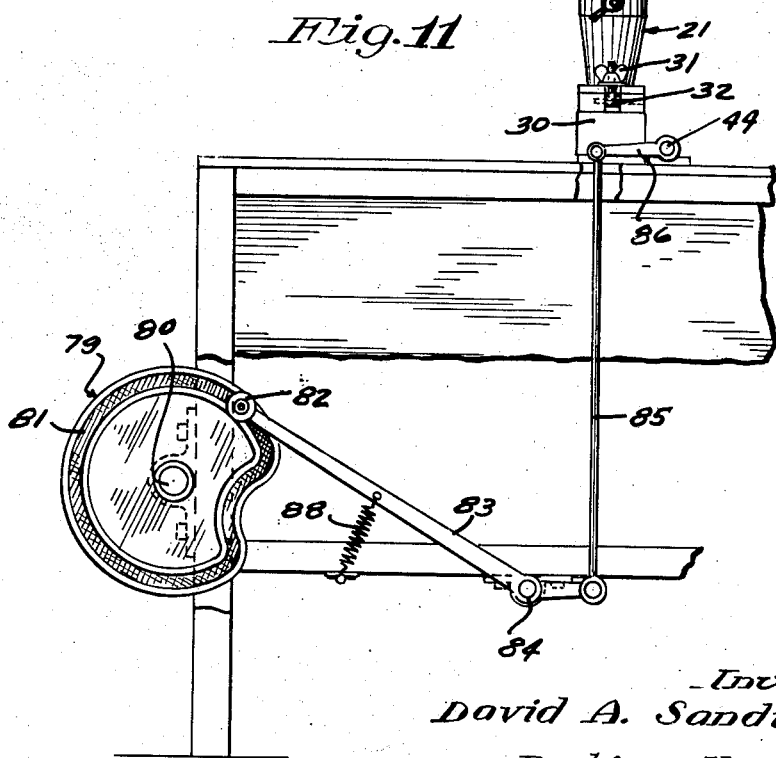
Inventor
David A. Sandin
By his Attorney
Merchant & Merchant Patented June 10, 1941

2,244,854

UNITED STATES PATENT OFFICE 2,244,854

DOUGHNUT MAKING MACHINE

David A. Sandin, St. Paul, Minn.

Application September 5, 1939, Serial No. 293,313

5 Claims. (Cl. 107—14)

My invention relates to improvements in automatic doughnut-making machines, and has as an important object to increase the capacity of such machines without increasing the over-all dimensions thereof. More particularly stated, it may be said that the invention pertains to doughnut-making machines of the well known type wherein dough from a suitable source, such as a supply tank or reservoir, is fed into a body of heated grease or oil such, for example, as lard or vegetable cooking compound, through a plurality of dough dispensing and forming devices.

With respect to the above noted objective, to wit, that of increasing the capacity of the machine, it may be said that whereas certain machines now commercially available on the market and having only two laterally spaced dispensing and forming devices may, by means of the present invention, have their capacity increased at least 50% by utilizing the instant invention which, as will hereinafter be seen, permits the use of at least one additional dispensing and forming device.

Another important object and advantage of the invention is the provision of a greatly improved operating and adjusting mechanism for the plurality of dispensing and forming devices, which mechanism is more positive in action than the previous mechanisms employed in similar machines, permits finer and more accurate adjustments than previous mechanisms, which positively retains adjustments, and which is more compact than previous mechanisms for the purpose.

In machines of this kind it is very important that each of the plurality of dispensing and forming devices be adjusted to operate simultaneously, and to form and dispense dough in doughnut shape of uniform size and shape from each of the plurality of dispensing and forming devices. The mechanism provided herein for operating the dispensing and forming devices permits rapid adjustment of the several dispensing and forming devices and retains adjustments indefinitely. Furthermore, this improved mechanism is of very simple and inexpensive character.

Another important object of the invention is to provide an improved distributing manifold from a common dough supply source or tank to the plurality of at least three doughnut dispensing and forming devices.

The above and numerous other important objects will be made apparent from the following specification, claims and drawings. In the accompanying drawings like characters indicate like parts throughout the several views.

Referring to the drawings:

Fig. 3 is a transverse sectional view taken on the line 3—3 of Fig. 1;

Fig. 4 is a fragmentary perspective view with some parts broken away and some parts sectioned, looking from the rear toward the front of the machine;

Fig. 5 is a horizontal sectional view taken on the line 5—5 of Fig. 3 looking downwardly;

Fig. 6 is a fragmentary perspective view illustrating part of the rock shaft and clutch assembly;

Fig. 7 is a detail sectional view taken on the line 7—7 of Fig. 5, some parts on the section line being shown in full;

Fig. 8 is a detail sectional view taken on the line 8—8 of Fig. 7;

Fig. 9 is a detail view partly in section and partly in full taken on the irregular line 9—9 of Fig. 7;

Fig. 10 is a fragmentary sectional view showing one of the several dispensing and forming devices illustrated similarly to Fig. 3 but with the parts in dough dispensing and forming position as distinguished with the inoperative closed position shown in Fig. 3; and Fig. 11 is a diagrammatic view intended merely to illustrate the driving connections for the rock shaft.

Figure 1:
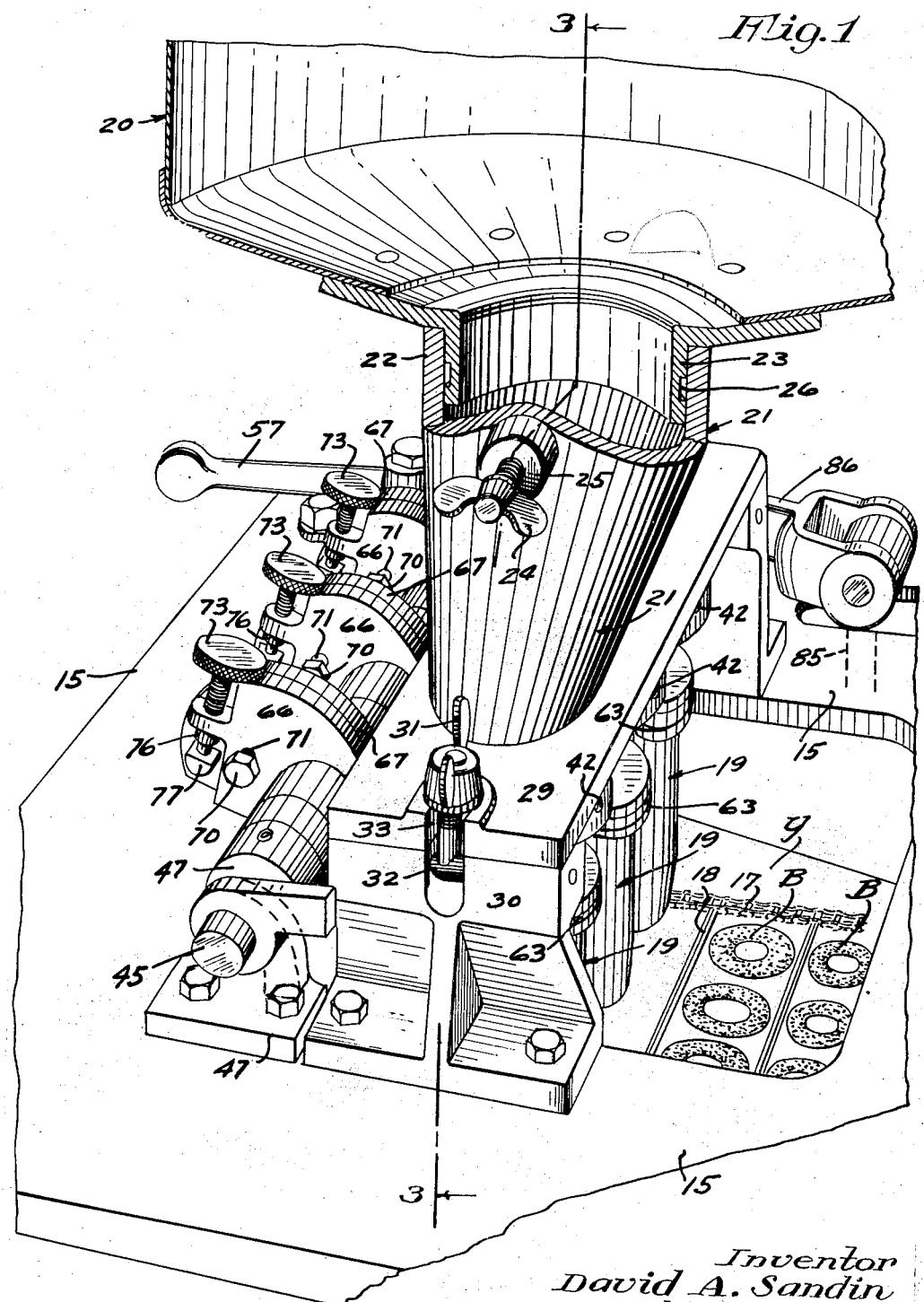
Fig. 1 is a fragmentary perspective view with some parts broken away and some parts shown in section, of the dough dispensing and forming end of a doughnut machine embodying the invention.

My invention is herein illustrated in connection with a machine which, for the most part, is conventional in character and commercially available, and certain of the old and well known parts of the machine will first be described.

In the drawings the main body or framework of the machine is indicated as an entirety by the numeral 15. This body or framework is a form to afford a hot fluid reservoir which is filled to a predetermined level with oil or grease $y$ that may be assumed to be maintained heated to a suitable temperature in accordance with conventional practice. This hot grease reservoir is indicated by the numeral 16.

Since the present invention deals primarily with the mechanism for dispensing and forming the dough preliminary to the cooking or frying operation, the mechanism for handling the dough after it is fed into the hot fluid has only been briefly indicated and will be only briefly described. It may be noted, however, that in accordance with conventional practice, there is provided within the fluid reservoir 16 a laterally spaced pair of endless conveyer chains 17, which are extended longitudinally of the machine in parallel relation, and are connected at longitudinally spaced points by transverse flights 18.

The upper portions of the endless chains 17 travel forwardly close to the top of the liquid y, and the flights 18, between the upper forwardly portions of the chain, project just slightly above and slightly below the level of the liquid y. The flights are spaced apart distances slightly greater than the maximum diameters of doughnuts in their finally cooked condition, and even in standard commercial machines hitherto produced which had only two laterally spaced doughnut dispensing and forming devices, the space between the chains 17 was sufficient to accommodate three doughnuts in laterally spaced relation.

The flights 18 form in the surface of the liquid longitudinally spaced doughnut-receiving sections, the most rearwardly located of which is directly beneath the laterally spaced plurality of doughnut-forming and dispensing devices, each indicated as an entirety by 19.

Located above the several dispensing and forming devices 19 is a supply tank or reservoir 20 of conventional character. This storage tank or reservoir is adapted to contain a body of fluid dough which, in accordance with conventional practice, is fed to the dispensing and forming devices under gravity, or a combination of gravity and air pressure, through a distributing manifold indicated as an entirety by 21. At this point it may be said that whereas the storage tank and dispensing and forming tubes are in themselves conventional in character, the distributing manifold 21, while having an outward appearance very similar to the conventionally used manifold or manifolds, is built to incorporate a novel design resulting in a high degree of uniformity of distribution of the dough to a plurality of at least three laterally spaced dispensing and forming devices. This feature of the manifold will be clearly described later on. As will be evidenced from the drawings, however, the manifold terminates at its upper end in a vertically disposed cylindrical flange 22, in which is telescopically applied a tubular discharge neck 23. For conveniently but positively detachably locking the tank 20 to the manifold, wing-equipped lock bolts 24 are screw-threaded into manifold bosses 25, and seated in an annular groove 26 in the discharge neck 23.

The manifold 21 is internally formed to afford a central vertically disposed discharge passage 27 and outer discharge passages 28, which latter are outwardly and downwardly divergent with respect to the central discharge passage 27. Of course, the several discharge passages 27 and 28 all communicate with the supply tank or reservoir 20 through the discharge neck 26 and the upper interior portion of the manifold and, as will be seen, by reference particularly to Fig. 3, passages 27 and 28 are laterally lined, laterally spaced, and all open through the bottom of the manifold 21 in a common vertical plane. The manifold 21 is provided at its lower edge with a flange-like mounting base or plate 29, the ends of which are normally seated on laterally spaced brackets 30. These brackets 30 are illustrated as being rigidly secured to the flat deck 31 of the main body 15 of the machine in the same manner as in certain commercial machines.

For detachably securing the manifold 21 to the mounting brackets, there are provided wing nut-equipped anchoring bolts 31. These bolts 31 are pivotally mounted in bifurcated portions of the brackets 30 at 32 so that they may be swung into and out of lateral notches 33 in the base plate 29 when the wing nuts 31 are loose.

Communicating with each of the manifold passages 27 and 28 is a radially flanged coupling tube 34. The lower end of each of the coupling tubes is externally threaded, and the upper end of each coupling tube is snugly telescopically fitted into the discharge end of its respective manifold passage 27 or 28. These tubular couplings 34 are anchored to the base of the manifold by means of screws or the like 35 passed through radial flanges 36 of the tubular couplings and into the bottom of the manifold.

The several dispensing and forming devices 19, which as previously indicated are conventional in character, comprise a fixed dispensing tube 37, the upper end of which is internally screw-threaded to receive the external screw threads of the tubular couplings 34, a valving sleeve 38 telescopically applied on and extending normally below the lower edge of the dispensing tube 37, and a rigid valve disc 39 that is rigidly supported from the tube 37 by means of an anchoring stem 40 and anchoring webs 41. To facilitate application of the dispensing tubes from their respective couplings 34, the enlarged internally threaded upper end portions of said dispensing tubes are provided with circumferentially spaced recesses 42 for accommodation of a suitable spanner wrench, or the like. The internal diameters of the several dispensing tubes 37 are alike and are, as a matter of fact, preferably the same diameters as the bores in the coupling flanges 34.

The valving sleeves 38 are freely axially slidable on the dispensing tubes 37 and are moved axially under operating conditions from normal valve closed positions shown in Fig. 3 to retracted valve open positions shown in Fig. 10. It will be noted that the valving discs 39 are spaced a material distance from the ends of the dispensing tubes 37 and are of diameters approximately the same as the external diameters of the dispensing tubes. By reference to Figs. 3 and 10, it will be seen that the valving sleeves 38, in their lower valve closed positions, project slightly over the valve disc 39 so as to close off the flow of dough from the dispensing tubes 37, but in their upper valve open positions the valving sleeves 38 are spaced materially from the valving discs 39 so as to provide an annular discharge passage therebetween and the peripheral edges of the valving discs for the annular discharge of dough.

All of the parts of the machine thus far described, with the exception of the construction and arrangement of the passages 27 and 28 in the manifold 21 and the embodiment of at least three laterally spaced dispensing and forming devices 19, are old. The novelty in this application, over and above the provision of the novel manifold and arrangement of the several dispensing devices, is believed to reside chiefly in the mechanism for operating the valving discs in unison and adjusting one with respect to the other and which mechanism will immediately be described.

This mechanism for operating the several dispensing devices in unison includes a horizontally disposed two-part rock shaft comprising axially aligned sections 44 and 45. These shaft sections 44 and 45 are free to rotate one with respect to the other but are butted one against the other, and the section 44 is provided with a reduced diameter pilot 46 that works in a receiving bore in the adjoining end of the section 45. The shaft section 45 is rotatively mounted near its opposite end portions in bearing lugs 47, and 48. The shaft section 44 is rotatively mounted and supported in a bearing lug 49 that is formed at its bottom in common with the bearing lug or bracket 48.

For providing driving engagement between the shaft sections 44 and 45 there is provided, between the bearings 48 and 49, a dog clutch 50, which clutch comprises a clutch element 51 fixedly mounted on the shaft section 45, and a cooperating clutch element in the nature of a shipper collar 52, axially slidably mounted on the shaft section 44. The shipper collar 52 is maintained in rotary driving engagement with the shaft section 44 by means of a key and keyway 53. The shipper collar 52 is provided with dogs 54 that are adapted to be received in correspondingly shaped notches or recesses 55 in the clutch element 51. The clutch element 51 is locked to the shaft section 44 by means of an allen set screw 56. For convenient manipulation of the shipper collar 52, there is provided an intermediately pivoted control lever 57. This control lever 57 is intermediately pivoted at 58 and its inner end portion is bifurcated and provided with opposed pin-like projections 59 that work in the peripheral groove 60 of the shipper collar.

For oscillating the several valving sleeves 38 in unison from the rock shaft section 45, there are provided three like cranks 61. Each of these cranks 61 is provided at one end with a tubular bearing sleeve 62 that is mounted on the shaft section 45, and the free end portion of each crank 61 is bifurcated to receive the enlarged upper end 63 of a different valving sleeve 38. Each of the cranks 61 operatively engage its respective valving sleeves 38 by means of an oppositely disposed pair of pin-like projections 64 that work in an annular peripheral groove or channel 65 in the enlarged upper end 63 of its valving sleeve 38.

For driving each of the cranks 61 from the shaft section 45 and for maintaining the several cranks in proper axial adjustment on the shaft section 45, each crank is provided with a radially projecting flange 66 that is adapted to be rotatively anchored to a similarly shaped flange 67 that is mounted on and maintained in driving engagement with the shaft section 45. The flanges 67 are each formed with a tubular mounting sleeve 68 that is rotatively locked to the shaft section 45 by an allen screw 69.

For adjustably anchoring the crank flanges 66 to the flanges 67, there are provided anchoring bolts or screws 70, one for each co-operative pair of flanges 66 and 67. These lock screws 70 are screw-threaded into the flanges 67 and work through circumferentially extended slots 71 in the flanges 66. Obviously when the screws 70 are loose, rotary individual adjustment of the cranks, with respect to the shaft section 45, will be permitted, but when the said screws 70 are tight, the co-operating flanges 66 and 67 will be maintained in tight face to face frictional engagement, which will result in positively anchoring the cranks 61 to the shaft section 45.

For providing vernier adjustment between the flanges 66 and 67 when the lock screws are loose, there are provided vernier adjustment screws 72 that have knurled heads 73. These adjustment screws 72 are rotatively mounted in rearwardly projecting lugs 74 of the flanges 66 and are maintained against axial movement therein by shoulders 75 on one side and stop collar 76 on the other side of said lug 74. The lower screw-threaded ends of the adjustment screw 72 are screw-threaded into nut-acting lugs 77 that are horizontally pivotally mounted and anchored in the flanges 67 at 78.

In practice it is very important that the several valving sleeves 38 be capable of very fine and accurate adjustments each with respect to the other and each with respect to its own co-operating valving disc 39. With the mechanism described this is very readily accomplished by loosening the lock screws 70 and manipulating the vernier adjustment screws 72 until each of the several dispensing and forming devices 19 simultaneously dispense dough in doughnut shape and of uniform size.

For operating the rock shaft the following described, more or less conventional, mechanism is illustrated as being employed. A tracer type cam 79 is mounted on a suitable power driven shaft 80. This cam 79 is a laterally opening channel 81 of irregular contour and which is engaged by the pin-equipped end 82 of a crank arm 83. The crank arm 83 is intermediately pivotally anchored at 84, and at its opposite free end is pivotally connected to a push rod 85 which connects through a rock arm 86 to the shaft section 44 to which the said rock arm is anchored by means of a set screw 87. Preferably and as illustrated, the crank arm 83 is biased in one direction by means of a spring 88. With the cam and operating connections shown, the cranks will be oscillated up and down once for each revolution of the cam to the extent necessary to axially slide the valving sleeves 38 from the position shown in Fig. 3 to the position shown in Fig. 10 and back again to the position shown in Fig. 3.

*Operation*

Assuming now that the supply tank or reservoir 20 is supplied with suitable dough in liquid form and that this dough is flowed down through the distributing manifold 21 to fill the interiors of the dispensing and forming devices 19, the operation of the machine will be substantially as follows.

Figure 2:
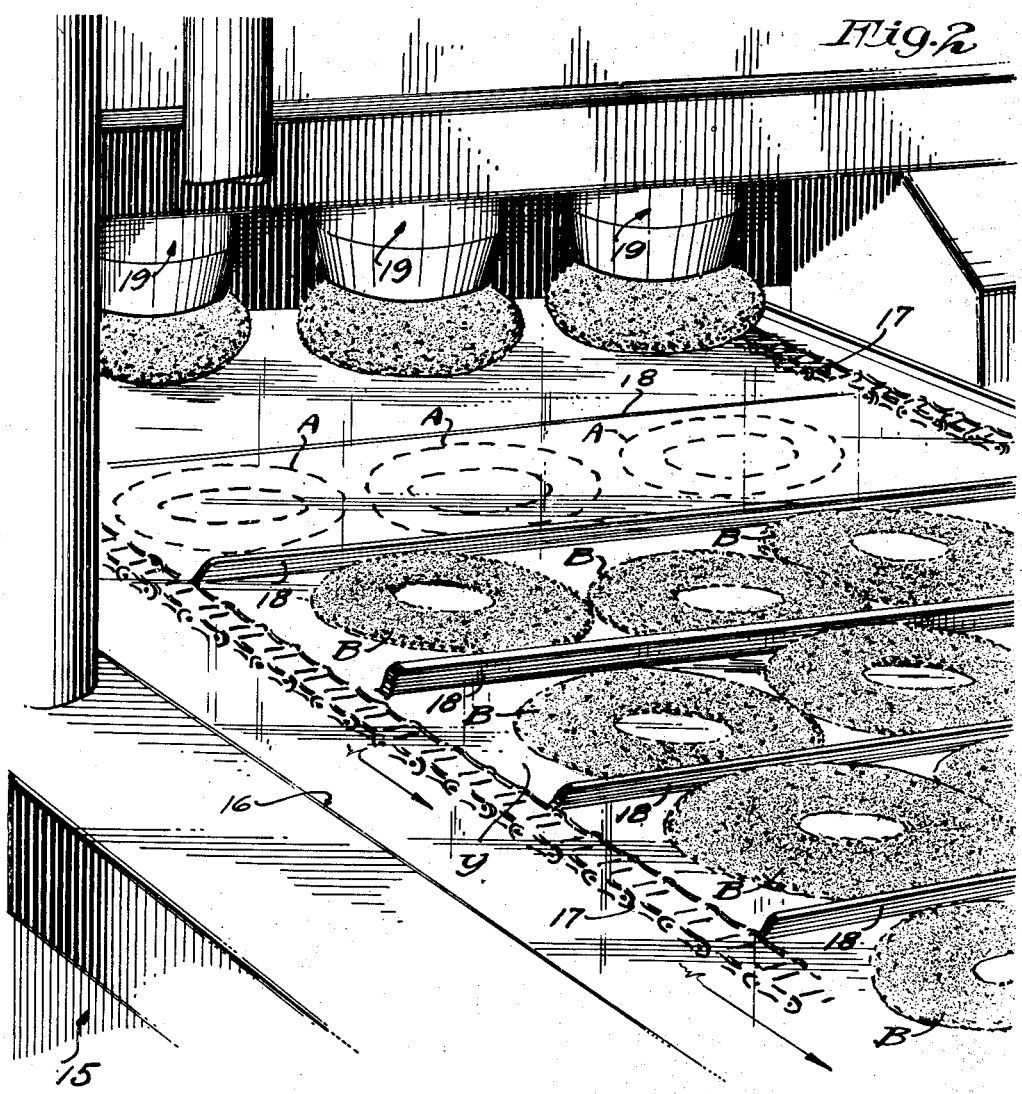
Fig. 2 is a fragmentary perspective view looking rearwardly into the interior of the machine.

The operator of the machine will, of course, first set the cam 79 and conveyer chains 17 in motion usually with the clutch 50 in released position shown in Fig. 5, under which condition the shaft section 44 will be rotatively oscillated, but the shaft section 45 and cranks 61 will remain stationary. To actually start the doughnut-making operation, the shipper lever 57 will be moved to cause engagement of the clutch elements 51 and 52 which will result in oscillation of the shaft section 45 and crank 61 with the shaft section 44. Of course, as long as the pin-equipped end 82 of crank 83 is riding in the circimferentially extended uniform radius portion of the cam channel 81, the valving sleeves 38 will remain in overlapping relation with respect to the valve discs 39 and the flow of dough will be positively cut off, but as the pin-equipped end 82 of crank 83 rides into the reversely curved portion of the cam channel 81, the valving sleeves 38 will be moved progressively upwardly from the position shown in Fig. 3 to the position shown in Fig. 10 and then back again to the position shown in Fig. 3. During this period when the valving sleeves 38 are moved away from their respective co-operating valving discs 39, the dough will flow out of the dispensing tubes 37 in annular doughnut formation and when the valving sleeves are moved back over the edges of the valving discs, the dough will be cut off and dropped into the hot grease. In Fig. 2 the formed dough just prior to being cut off and dropped is shown hanging on the ends of the dispensing devices 19 and is just about to be dropped into the grease to the positions shown by dotted lines A in Fig. 2.

The dough thus dropped in doughnut form will be moved along by the flights 18 of the conveyer chains from left toward the right in respect to Figs. 1 and 2. In Figs. 1 and 2 doughnuts previously dispensed and being moved along in the hot grease during the cooking operation are indicated by B.

Since it is necessary to remove the reservoir 20, manifold 21 and dispensing devices 19 for cleaning after each run of doughnuts is complete, the valving sleeves 38 are often dropped, or otherwise have their free end portions which co-operate with the valve discs 39, damaged and, of course, correction of this requires grinding off and truing up of the damaged end of the valving sleeves 38. Of course, this re-forming of the valving ends of the sleeves 38 requires compensating readjustment of the valving sleeves with respect to the rock shaft, but with the mechanism described, this is very readily accomplished, and when the new adjustment is made, the shaft elements are again positively locked together so that adjustments will remain indefinitely. Not only is this mechanism described very desirable from the point of view of making adjustments and retaining adjustments, but the simplicity and compactness thereof permits, in accordance with the present illustration, three dispensing and forming devices to be placed side by side in a space previously permitting only two of such dispensing and forming devices.

Of course, the provision of more than two dispensing and forming devices 19 presented a serious problem in manifold construction which was not present in the previous devices employing only two dispensing devices and in which like and vertically disposed manifold passages were provided in the manifold for the opposite dispensing devices. In the present arrangement the center manifold passage 27 is vertical, whereas the opposite side manifold passages 28 are at an outwardly diverging angle and are longer than the passages 27. Hence, it will be seen that the matter of flowing a uniform amount of dough under uniform pressure to the several dispensing devices 19 presented a serious problem because of the reduced effect of gravity on the diverging passages 38 as compared to the passage 27 and also due to the increased length and consequent greater friction of the passages 28 with respect to the passage 27. In the present structure this was finally overcome and a uniform delivery rate provided to the several dispensing devices 19 by making the center manifold passage 27 of uniform diameter throughout its length and making the outer manifold passages 28 of progressively increasing diameter from bottom toward the top, all passages 27 and 28 being of the same diameter at their delivery ends.

What I claim is:

1. In a doughnut-making machine, a plurality of laterally spaced dough dispensing and forming devices each including a valve element mounted for sliding movement to and from closed position, a rock shaft, a plurality of cranks rotatively mounted on said rock shaft with the free end portion of each in operative engagement with a different one of said sliding valve elements, a radially projecting flange on each of said cranks, driving flanges rigidly mounted on the rock shaft, each in face to face contact with a different one of the said crank flanges, means for effecting individual vernier rotary adjustment of the several cranks on the shaft, said means including a vernier adjustment screw for each co-operating pair of flanges, said screw having screw-threaded engagement with one of said flanges and being rotatively mounted on and held against axial movements in respect to the other thereof.

2. In a doughnut-making machine, a plurality of laterally spaced dough dispensing and forming devices each including a valve element mounted for sliding movement to and from closed position, a rock shaft, a plurality of cranks rotatively mounted on said rock shaft with the free end portion of each in operative engagement with a different one of said sliding valve elements, a radially projecting flange on each of said cranks, driving flanges rigidly mounted on the rock shaft, each in face to face contact with a different one of the said crank flanges, means for effecting individual vernier rotary adjustment of the several cranks on the shaft, said means including a vernier adjustment screw for each co-operating pair of flanges, said screw having screw-threaded engagement with one of said flanges and being rotatively mounted on and held against axial movements in respect to the other thereof, and a lock nut screw-threaded into one of each pair of co-operating flanges and working through an arcuate slot in the other thereof.

3. In a machine of the class described, a plurality of laterally spaced reciprocating valving elements, a rock shaft, a plurality of cranks rotatively mounted on said rock shaft with the free end portion of each in operative engagement with a different one of said reciprocating valving elements, a radially projecting flange on each of said cranks, driving flanges rigidly mounted on the rock shaft each in face to face engagement with a different one of said crank flanges, means for effecting individual vernier rotary adjustment of the several cranks on the shaft, said means including a vernier adjustment screw for each cooperating pair of flanges, said screw having threaded engagement with one of said flanges and being rotatively mounted on and held against axial movements in respect to the other thereof.

4. The structure defined in claim 3 in further combination with means for positively locking the cooperating flanges together in adjusted position, said last named means comprising a head screw working through a radial slot in one of each pair of cooperating flanges and having screw threaded engagement with the other flange of each pair thereof.

5. In a doughnut-making machine, the combination with a plurality of laterally spaced parallel doughnut-forming and dispensing devices, each of said dispensing and forming devices comprising a fixed, vertically disposed dispensing tube, a valving disc substantially the same diameter as the exterior of the dispensing tube fixedly anchored in spaced relation to the lower free end of the dispensing tube, and a valving sleeve axially slidably mounted on the dispensing tube and adapted to be reciprocated from a position wherein it overlaps the valving disc and closes off the dispensing tube to an upward position wherein it opens the annular space between the dispensing tube and valving disc, of means for reciprocating the said valving sleeves in unison comprising a horizontally disposed rock shaft rotatively mounted in spaced relation to said dispensing devices, a plurality of cranks rotatively mounted on the rock shaft, one in alignment with each of the said dispensing devices, each of said cranks being bifurcated at its free end to receive the valving sleeve of its cooperating dispensing device, said valving sleeves having circumferentially extended radially outwardly opening channels for receiving opposite end portions of the bifurcated cranks, said cranks each being formed with a radially projecting flange, a driving flange for each crank, said driving flanges being fixedly mounted on the shaft one in face to face contact with each of said crank flanges, means for locking the said co-operating flanges together in different rotatively adjusted positions, a shaft section axially aligned with said rock shaft, means for rotatively oscillating the said shaft section, and a manually operative clutch for operatively engaging and disengaging said shaft section with said shaft.

DAVID A. SANDIN.